Dec. 4, 1928.
W. A. DOBSON
1,693,708
TYPEWRITING MACHINE
Filed Oct. 24, 1925
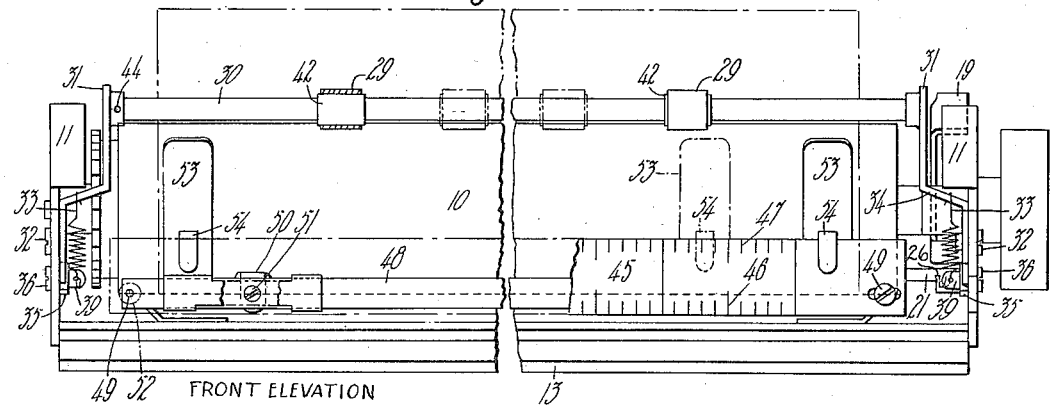
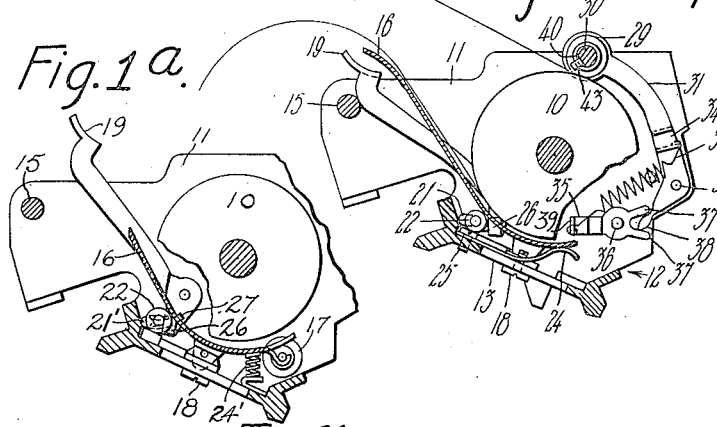
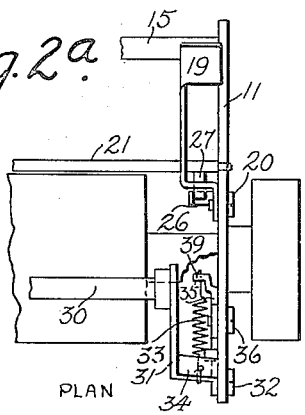
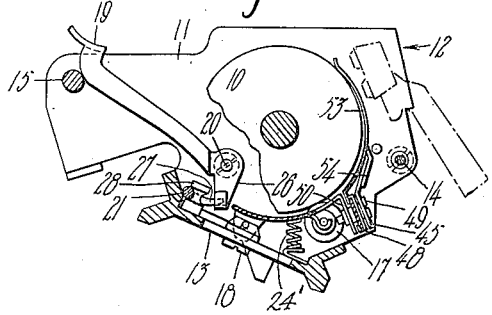
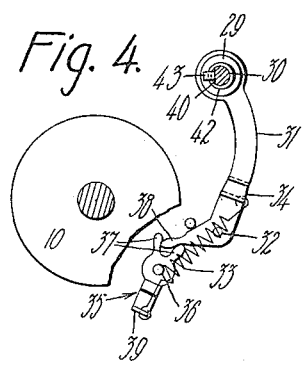
Inventor:
William A Dobson
by B C Stickney
Attorney Patented Dec. 4, 1928.

1,693,708

UNITED STATES PATENT OFFICE.

WILLIAM A. DOBSON, OF BRIDGEPORT, CONNECTICUT, ASSIGNOR TO UNDERWOOD ELLIOTT FISHER COMPANY, OF NEW YORK, N. Y., A CORPORATION OF DELAWARE.

TYPEWRITING MACHINE.

Application filed October 24, 1925. Serial No. 64,540.

This invention relates to paper feeding and positioning devices for portable typewriting machines, and one of its objects is to provide an inexpensive mechanism which is simple, compact, durable and light.

It is customary to provide feed-rolls to run on the platen just below the printing line, and also front feed-rolls above the printing line, which front feed-rolls are effective to pull up on the work-sheet and to control the position thereof when the work-sheet has been advanced so far that the trailing edge disengages the feed-rolls under the platen.

Another feature of this invention relates to novel means whereby the front feed-rolls may be rendered either effective or ineffective, and also to novel means whereby the feed-rolls may be positioned, so as to hold the outer edges of the work-sheet upon the platen.

According to another feature of the invention, the front rolls are slidably and rotatably mounted upon a cross-bar fast to arms pivotally mounted on the side plates of the platen-frame. By swinging the cross-bar towards or away from the platen, the feed-rolls are either rendered operative or inoperative, and, in order that the bar may be held under tension when the feed-rolls are in contact with the platen and away from the platen in their ineffective position, there are provided over-center springs actuating upon the arms supporting the cross-bar.

Owing to the compact design of the Underwood portable typewriter, and in order to increase the efficiency of the springs. there may be provided overthrow devices effective to change the position of the anchoring point of the springs. Said overthrow devices may be operatively connected to the arms upon which the cross-bar is pivotally mounted, so as to swing in a direction opposite to that of the arms.

Another feature of this invention relates to novel means for positioning the front paper-fingers in front-strike typewriting machines. According to this feature, the paper-fingers are slidably mounted upon a cross-bar in front of the platen, and the front scale is placed over the cross-bar in a manner to co-operate with indicating devices forming an integral part of the paper-fingers, said indicating devices being advantageously used as finger-pieces to move the paper-fingers.

Other features and advantages will hereinafter appear.

In the accompanying drawings,

Figure 1 is a front view, in elevation, showing the platen-frame of an Underwood portable typewriting machine having the invention applied thereto.

Figure 1ª shows the feed-rolls released.

Figure 2 is a cross-sectional view, in elevation, through the center of the platen, and shows the front feed-rolls in their effective position.

Figure 2ª is a plan of parts seen at Figure 1ª.

Figure 3 is a cross-sectional view showing the paper-fingers and means for mounting the same.

Figure 4 is a diagrammatic view, in cross-section, showing the front feed-rolls in their released position.

Figure 5 is an enlarged detail view of the feed-rolls, partly in cross-section, and shows the means whereby the feed-rolls may be positioned along the shaft.

This invention is illustrated as applied to an Underwood portable typewriting machine, which, like most front-strike machines, has a platen 10 revolubly mounted upon end plates 11 of a platen-frame or carriage 12. The end plates may be secured to a guiding plate 13 upon which the carriage is mounted for letter-space travel. To further stiffen the carriage-frame, there may be provided cross-bars 14 and 15, which bars serve as tie-rods between the plates.

In order to conduct the work-sheet around the platen, there is provided a work-sheet guide or apron 16, upon which a pair of feed-rolls 17, extending substantially the length of the apron, are revolubly mounted. The apron 16 is pivotally supported at 18 upon the guiding plate 13, and there is provided novel means whereby, by means of a lever 19 pivotally mounted at 20 upon one of the end plates 11, the feed-rolls 17 may be released to straighten out the work-sheet, or for any other reason.

The releasing means may include a shaft 21 rockably mounted at the rear of the apron 16, as shown in Figures 2ª and 3, and a crank-arm 21' forming an integral part thereof upon which there is a roller 22 designed to engage the back of the apron in a manner to rock and lock the apron when the lever is swung, thereby releasing the pressure of the feed-rolls and locking them in their released position. The shaft 21 is journaled at one end in an end plate 11, as shown in Figure 2ª, and extends along the guide-plate 13 to the longitudinal center of the platen, where it terminates in the crank-arm 21'. The apron 16 may be held in its normal position by means of leaf-springs 24, secured to the guiding plate 13 by means of screws 25, or else by means of spiral springs 24', shown in Figures 1ª and 3. When the lever 19 is swung forwardly to release the pressure of the feed-rolls, a lower extension 26 of said lever 19 engages with a finger 27 forming an integral part of the shaft 24, thereby swinging the roller 22 to effective position. One end of the shaft 21 is held in its normal position by means of a grooved stud 28 fast to the guiding plate 13 near the crank-arm 21'.

In order to more effectively hold the work-sheet around the platen, there are provided front feed-rolls 29 revolubly mounted upon a shaft 30. Forming an integral part of said shaft at the ends thereof, there are provided a pair of arms 31 pivotally mounted upon studs 32 fast to the end plates 11. The front feed-rolls 29 may be swung to either effective or ineffective position, as shown in Figures 2 and 4, respectively, and in order that the feed-rolls may be held under tension when engaging with the platen, there are provided over-center springs 33. Said springs are secured to the arms 31 at 34, and in order to increase their over-center throw, there is provided a switch-lever 35 for each spring mounted at 36 upon the plates 11, the upper end of each lever having bifurcated ends 37 designed to engage with a tongue 38 forming an integral part of each arm 31. The lower ends of the arms are provided with tabs 39 for securing the lower ends of the springs 33. It will be seen that rocking the arms 31 automatically rocks the switch-lever 35 across the pivot 36, thereby increasing the effectiveness of the springs by a comparatively short movement of the actuating arms.

It will be observed from Figure 4 that the spring 33 passes to the right of pivot 36 of switch-lever 35, and that the force of this spring is exerted by a tooth or furcation 37 against the tongue 38 at a considerable distance from the pivot 32 of the arm 31. The result of this construction is that the arm 31 is held with considerable force in either operative or inoperative position. As shown, the spring passes through the pivot 32, which is a dead point, and therefore there is no moment tending to rotate the arm clockwise. In fact the spring might even pass to the left of pivot 32, but to the right of the point of contact of the right tooth 37 with the tongue 38, and yet maintain the arm 31 in inoperative position because of the greater moment arm of the force acting on arm 31 at the point in a counterclockwise direction.

Novel means are provided in this invention for adjustably positioning the front feed-rolls along the shaft 30. To this end, the shaft is provided with a flat or cut-away portion 40 extending substantially the full length thereof, and serves as a means for receiving springs 41, which hold sleeves 42 in any desired position upon the shaft. Referring more particularly to Figure 5 in which an enlarged view of one of the rolls 29 is shown, it will be noted that the springs 41 are intended for the double purpose of holding the sleeves under tension upon the shaft and to hold the rolls 29 in place over the sleeves. To this end, the springs 41 may be provided with outwardly-extending fingers 43 at the ends thereof, which fingers, by extending above the outside diameter of the sleeves, will hold the rolls in place. Owing to the construction of the rolls 29, however, it will be necessary to assemble the sleeves and the springs together with the rolls as a unit preparatory to sliding the assembled unit upon the shaft. It is, therefore, proposed to permanently fasten one of the arms 31 to the shaft, and to secure the other arm to the shaft by means of a pin 44. In this manner, it is possible to replace the rolls if desired for any reason, and still have a rigid structure to support the rolls.

According to another feature of this invention, there is provided a front scale 45, having lower graduations 46 to position the carriage relatively to the printing point, and upper graduations 47 for positioning the work-sheet relatively to the lower graduations on the scale. The scale is secured upon a cross-bar 48 by means of screws 49 at the ends thereof, the cross-bar being, in turn, secured to lugs 50 of the apron 16 by means of screws 51, the heads of which are sunk into the cross-bar 48.

The scale 45 is separated from the cross-bar 48 by means of washers 52, so as to provide a clearance and to permit the movement of paper-fingers 53, slidably mounted on said cross-bar. Since the paper-fingers are mounted on the cross-bar 48, and the cross-bar is secured to the apron, it follows that upon swinging the apron forward to release the feed-rolls 17, the paper-fingers, which are normally held in engagement with the platen, will also be released.

In order that the paper-fingers 53 may be positioned along the cross-bar 48 relatively to the scale 45, they may be provided with finger-pieces 54, forming an integral part of said paper-fingers.

It will be noted that the sleeves 42 are flangeless, the sleeves being formed, at a low production cost, from a continuous tube fed through an automatic screw machine to be cut up into sleeve-lengths with practically no loss of stock and material, and that the springs 41 are practically U-shaped and operate to frictionally hold the sleeve upon the rod and also provide flanges operative to retain the rolls 29 upon the sleeves 42.

Variations may be resorted to within the scope of the invention, and portions of the improvements may be used without others.

Having thus described my invention, I claim:

1. The combination with a typewriting machine having a platen revolubly mounted in end plates of a platen-frame, of feed-rolls mounted upon a shaft running parallel with the platen axis, side arms supporting said shaft and rockably mounted on the platen-frame so as to be operable to move said rolls into or out of engagement with the platen, and means for maintaining said rolls in the operative or inoperative position, including a double-acting spring attached at one end to one of said arms, and means for attaching the other end of said spring to the platen-frame, said attaching means having provision for increasing the effective moment upon said supporting arm of the force of the spring beyond the amount directly due to the rocking of the supporting arm.

2. The combination with a typewriting machine having a platen revolubly mounted in end plates of a platen-frame, of feed-rolls mounted upon a front shaft, side arms supporting said shaft, said arms being pivotally mounted upon the end plates of the platen-frame, and means for resiliently holding the feed-rolls in either effective or ineffective position, said means including over-center springs and spring switch-levers operable by each side arm for increasing the over-center sweep of the springs when the rolls are swung from effective to ineffective position.

3. A platen-frame for a typewriting machine including, in combination, a platen revolubly mounted in end frames tied together by means of tie-rods and a guiding plate, so as to form a rigid structure, an apron encircling the lower portion of the platen, said apron extending rearwardly to form a chute to conduct a work-sheet to the platen, feed-rolls revolubly mounted on said apron, under the platen, means for rockably mounting said apron upon the guiding plate, means for normally holding said feed-rolls in engagement with the platen, and means for releasing said feed-rolls, said last-mentioned means including a rock-shaft at the rear of the platen extending from one end of the platen-frame to about the center of the platen, said shaft being offset to form a crank, and having an anti-friction roller thereon to engage with the rear face of the apron, so that when the shaft is rocked the roller will cam and lock the apron forwardly, thereby releasing the feed-rolls from contact with the platen.

4. A platen-frame for a typewriting machine including, in combination, a platen revolubly mounted in end frames tied together by means of tie-rods and a guiding plate, so as to form a rigid structure, an apron encircling the lower portion of the platen, said apron extending rearwardly to form a chute to conduct a work-sheet to the platen, feed-rolls revolubly mounted on said apron, under the platen, means for rockably mounting said apron upon the guiding plate, means for normally holding said feed-rolls in engagement with the platen, means for releasing said feed-rolls, said last-mentioned means including a shaft at the rear of the platen extending from one end of the platen-frame to about the center of the platen, said shaft being offset to form a crank, and having a roller to co-operate with the rear side of the apron, so that when the shaft is swung the roller will swing the apron forwardly, thereby releasing the pressure of the feed-rolls, and means for swinging the shaft, said swinging means including an arm pivotally mounted on one of the end frames, said arm having a lower extension designed to engage a short arm forming an integral part of said shaft.

5. In a typewriting machine having a platen, a platen-frame therefor, an apron encircling the lower portion of the platen, a cross-bar secured to the front edge of said apron below the printing point, front paper-fingers slidably mounted on said cross-bar, a front scale secured to said cross-bar and in front of the paper-fingers, the upper portion of the paper-fingers extending above the scale, and finger-pieces forming an integral part of said paper-fingers, said finger-pieces extending forwardly and downwardly in front of the scale.

6. The combination with a typewriting machine having a revolubly mounted platen and platen-frame therefor, of feed-rolls revolubly and slidably mounted upon a front feed-roll-shaft, said shaft having arms at the ends thereof and fast thereto, said arms being pivotally mounted upon end plates of the platen-frame, and means for resiliently holding the front feed-rolls in engagement with the platen, said resilient means including a switch-lever pivoted upon the frame and connected to one end of a spring and automatically swingable by an arm to sweep the spring across the pivot of said lever and resiliently hold the front feed-roll-shaft raised in an ineffective position.

7. The combination with a typewriting machine having a revolubly mounted platen, a platen-frame therefor, of front feed-rolls revolubly and slidably mounted upon a front feed-roll-shaft, said shaft having arms at the ends thereof and fast thereto, said arms being pivotally mounted upon end plates of the platen-frame, and means for resiliently holding the feed-rolls in either effective or ineffective position, said means including levers pivotally mounted on said end plates, said levers having bifurcated ends co-operating with fingers forming an integral part of said arms in a manner to rock the levers when the feed-roll-shaft is swung from effective to ineffective position, and springs actuating between the arms and a lower extension of the levers to hold the arms in either effective or ineffective position.

8. In a typewriting machine, the combination with a platen revolubly mounted within a carriage having end frames, of front feed-rolls rotatable upon a cross-rod rigidly secured between a pair of arms, said arms being pivoted to the end frames in front of the platen, a spring connected to each arm, and a swivel-member pivotally mounted upon each end frame and connected to the springs, each swivel-member co-operative with the arms to urge the feed-rolls against the platen at one position of the arms and at another position of said arms to urge the feed-rolls away from the platen, said swivel-member being operative to shift the axis of the spring relatively to the axis of the swivel.

9. In a typewriting machine, the combination with a platen revolubly mounted within a carriage having end frames, of feed-rolls mounted upon a rod supported by a pair of arms pivoted to each end frame, a movable member interlocking with each of said arms, and a spring anchored at one end to each arm and at the other end to the interlocking movable member, so that in swinging the feed-rolls from effective to ineffective position, and vice versa, the end of the spring anchored to the movable member will shift its position in reverse direction to the movement of said arms and increase the over-center sweep for the spring.

10. In a typewriting machine, the combination with a platen revolubly mounted within a carriage having end frames, of feed-rolls mounted upon a shaft supported by a pair of arms pivoted to each end frame, a motion-multiplying lever pivoted to each side frame adjacent the swinging arms to interlock therewith, and springs anchored at one end to each arm and at the other end to the pivoted lever associated with said arm, so that in swinging the feed-rolls from effective to ineffective position, the end of the spring anchored to the pivoted lever will shift its position and increase the over-center sweep for the spring.

11. In a typewriting machine, the combination with a platen, of an apron having lugs integral therewith for pivotally mounting said apron, said apron encircling the lower portion of the platen and extending rearwardly to form a chute to conduct a worksheet around the platen, feed-rolls revolubly mounted in the forward portion of the apron and spring-pressed against the platen, means including a rock-shaft having a crank-arm end-portion integral therewith and carrying a roller for engagement with the rear face of the apron to vibrate said apron and release the feed-rolls, and means for actuating the rock-shaft, including a finger-lever pivoted upon the carriage-end.

12. The combination with a typewriting machine having a platen revolubly mounted in end plates of a platen-frame, of feed-rolls mounted upon a shaft running parallel with the platen-axis, side arms supporting said shaft and rockably mounted on the platen-frame so as to move said rolls into and out of engagement with said platen, and means for maintaining said rolls in the operative or inoperative position, including a spring attached at one end to one of said arms and at the other to a movable member, and means for moving said member in the reverse rotative direction upon rocking said arm.

13. In a typewriting machine having a platen and platen-frame therefor, an apron encircling the lower portion of the platen and rockably mounted therebelow, feed-rollers mounted on said apron forwardly of its pivot, a cross-bar secured to the front edge of said apron below the printing point, front paper-fingers mounted on said cross-bar, a front scale secured to said cross-bar and in front of the paper-fingers, means for urging the forward part of the apron toward the platen so as to dispose the rollers, paper-fingers and scale in operative relation thereto, and means for moving said forward part of the apron away from the platen to release the rollers and fingers.

14. The combination with the platen and platen-frame of a typewriting machine, of a cross-bar in front of said platen and below the printing point, paper-fingers slidably mounted on said bar, and a scale attached to said bar in front of said paper-fingers and with which said fingers are arranged to cooperate.

WILLIAM A. DOBSON.